United States Patent [19]
Thomson

[11] 4,431,371
[45] Feb. 14, 1984

[54] GAS TURBINE WITH BLADE TEMPERATURE CONTROL

[75] Inventor: Wallace B. Thomson, Northridge, Calif.

[73] Assignee: Rockwell International Corporation, El Segundo, Calif.

[21] Appl. No.: 387,736

[22] Filed: Jun. 14, 1982

[51] Int. Cl.³ .............................................. F04D 31/00
[52] U.S. Cl. .................................... 415/116; 415/117; 415/179
[58] Field of Search ............... 415/116, 117, 143, 179; 60/39.19, 39.43

[56] References Cited

U.S. PATENT DOCUMENTS 2,925,954  2/1960  Spillmann et al. ................... 415/179
2,951,340  9/1960  Howald ............................... 415/116

FOREIGN PATENT DOCUMENTS 1002481  10/1946  France ................................. 415/116

Primary Examiner—Harvey C. Hornsby
Assistant Examiner—Shewen Bian
Attorney, Agent, or Firm—Henry Kolin; Clark E. DeLarvin; H. Fredrick Hamann

[57] ABSTRACT

A gas turbine in which hot gas is directed only over a portion or preselected number of the turbine blades and means are provided for directing a flow of a cooling gas over another portion or different preselected number of blades. In accordance with a preferred embodiment, the means for providing cooling gas comprises a compressor means located adjacent the turbine. Preferably the gas turbine comprises a plurality of alternating compressor means and turbine stages wherein the direction of flow of cooling gas is countercurrent to that of the hot gas flowing through the turbine stages.

15 Claims, 3 Drawing Figures

GAS TURBINE WITH BLADE TEMPERATURE CONTROL

BACKGROUND OF THE INVENTION

The invention relates to a gas turbine with means for maintaining the turbine rotor blades at a low temperature. It particularly relates to a gas turbine wherein a hot gas is directed over only an annular portion of the turbine blades and a cooling gas is directed over another separate annular portion of the blades.

The efficiency of the gas turbine is greatly affected by the gas temperature and the efficiencies of the air compressor and the turbine. Significant developments in the field of aerodynamics have greatly improved the efficiencies of the compressor and turbines such that now one of the more important keys to improving thermal efficiencies of gas turbines is by elevating the inlet gas temperatures. However, the inlet gas temperatures are limited to those which can be withstood by the turbine materials of construction without a significant loss of structural integrity. At the present time most materials utilized in commercial gas turbines are limited to a maximum temperature of about 1800° F. (1256° K.) and generally operate at a temperature of about 1400° F. (1033° K.).

To permit the use of higher temperatures considerable research has been devoted to developing alloys which will withstand higher temperatures. In addition various means for cooling the turbine rotor or disc and blades to control their temperature have been proposed. For example, in U.S. Pat. No. 3,318,573 there is described a rotor wherein guide blades direct a flow of cooling air radially outward over the surface of the turbine disc in an attempt to maintain the disc at a low temperature. A similar approach is shown in U.S. Pat. No. 3,535,873 which describes a device for cooling gas turbine rotating members. In the device disclosed therein cool air from the stationary part of the engine is blown over the surface of the turbine disc, the amount of air being dependent upon the degree of cooling required.

In U.S. Pat. No. 3,904,307 there is disclosed another gas generator turbine cooling scheme which comprises an arrangement for cooling the high and low pressure rotors of a gas turbine. Cooling air is supplied from a source downstream of the rotors through the low pressure rotor to the space between them and from this space through the blades, and also to the space upstream of the high pressure rotor for cooling the face thereof.

In those proposals in which relatively cool air is directed through passageways formed in the turbine blades, the cooling effect provided by this air lowers the temperature of the blade material to a level at which melting or burning will not occur and at which the blade material has sufficient strength. One of the more difficult problems encountered in cooling turbine rotors in this fashion, however, is internally ducting the cooling air from the compressor to the turbine, which is rotating at high speeds. In usual practice the cooling air bypasses the engine combustor and is then introduced into passageways formed in the turbine rotor. Generally, the entrances to these rotor passageways have a peripheral speed of several hundred feet to as high as 2000 feet per second. Thus, it is inherent in the delivery of cooling air to the turbine in this fashion that a relatively large amount of work must be done on the cooling air to introduce it into the rotor. This work results in an increase in the temperature of the cooling air as it enters the turbine. This, in turn, reduces the cooling effectiveness of a given mass of air for reducing the temperature of the blades and other components of the turbine which are to be cooled thereby.

In an effort to overcome these problems it is proposed in U.S. Pat. No. 3,703,808 to provide a blade tip cooling air expander and seal system wherein cooling air is introduced into a chamber located above the blade tips. The cooling air passes through a plurality of nozzles located over the rotating blades. These nozzles accelerate the cooling air in the direction of wheel rotation and discharge it into a chamber which is bounded by stationary case hardware, the cooling air nozzles, a rotation shroud on the blade tips, and sealing elements located at the upstream and downstream ends of the blade shroud. The cooling air then flows into the cooling circuit formed with each blade from the chamber via a passageway through the blade shroud.

The problem with these cooling techniques is that they not only require a great deal of cooling air but frequently result in offsetting the cycle efficiency which was to be increased by elevating the temperature of the gas at the inlet of the turbine. More particularly, a great deal of work is required to compress the required amount of cooling gas. Further, the compression of the cooling gas raises its temperature, thus reducing its cooling capacity. Another problem is that the physical size restrictions of cooling passageways located inside the turbine blades limits the quantity of cooling gas that can be passed therethrough. In addition, these techniques frequently require complication construction of the rotating parts. Thus, there clearly is need for a gas turbine which can operate for sustained periods utilizing hot gases at temperatures above 3000° F. (1922° K.) or higher, which does not require expensive high temperature alloys for the materials of construction, complicated internal passageways, and cooling air workloads that offset the cycle efficiency gained by the use of higher temperature inlet gases.

In contrast to the types of gas turbines hereinbefore described, it is reported (K. Leist and E. Knornschild, NACA TM 1294, "Exhaust Turbine and Jet Propulsion Systems," translation of a 1939 German report) that a different type of gas turbine was developed and tested in Germany. Specifically, the gas turbine had hot gas directed over only a portion or preselected number of the turbine blades. The remainder of the turbine blades and rotor were exposed to ambient air for cooling. No further work is known to have been done on this type of turbine and it is believed that development was discontinued as a result of poor cycle efficiencies.

SUMMARY OF THE INVENTION

It is an object of the present invention to provide a gas turbine which can utilize hot gases at temperatures as high as 3000° F. (1922° K.) or higher. It is another object of the invention to provide such a turbine which does not require the use of expensive high-temperature alloys while still maintaining the capabilities of using high temperature gases. It is another object of the invention to provide a gas turbine in which the temperature of the blades is controlled and maintained at less than about 1000° F. (811° K.) while utilizing a hot gas having a temperature of 3000° F. (1922° K.) or more. It is a further object of the invention to provide such a turbine with a compressor means for supplying cooling gas in which the efficiency lost in cooling the turbine blades is minimized. It is another object of the invention to provide a gas turbine with compressor means for supplying a cooling gas in which leakage between the cooling gas and the hot gas flowing through the turbine is substantially minimized. These and other objects of the invention will become apparent from the following description.

The present invention provides an improvement in a gas turbine which includes a housing having a hot gas inlet and a hot gas outlet, a rotatable shaft mounted in the housing and at least one turbine stage comprising a turbine rotor. The turbine rotor typically includes a disc member affixed to the shaft and a plurality of turbine blades located about the periphery of the disc, each of the blades having a root section affixed to the disc and a radially outwardly extending surface terminating in a tip section. The improvement comprises providing a nozzle means for directing a hot gas over only a portion or preselected number of the turbine blades. It further includes a shroud member enveloping another portion or preselected number of the turbine blades. The shroud member includes an inlet and outlet for a cooling gas and a guide means is provided for directing the cooling gas radially inward or outward over the surface of the blades. A deflection means directs cooling gas from the blades to the cooling gas outlet of the shroud. In operation, of course, all of the blades pass the hot gas nozzles and then pass through the shroud member where they are exposed alternately to hot gas and cooling gas, respectively.

In accordance with a preferred embodiment the turbine further includes compressor means operably connected to the turbine shaft and having a cooling gas inlet and outlet, the outlet being in fluid communication with the shroud inlet for providing a flow of pressurized cooling gas to the shroud. The pressurized cooling gas is preferably supplied at substantially the same pressure as the pressure of the hot gas which will pass over the blades of the turbine whereby leakage between the two gases is substantially minimized.

Generally, the guide means will provide for directing cooling gas radially downward over the tip section of the blades towards the root section and the deflection means will be located adjacent the root section of the blades. It will be appreciated, however, that the flow of cooling gas also could pass from the root section radially outward over the tip section with equal effect and minimal pressure loss. It is an essential feature of the present invention, however, that the cooling gas flow radially over the outer surfaces of the blades.

In accordance with a particularly preferred embodiment of the invention, the gas turbine will comprise a plurality of turbine stages in axial alignment with one another and the nozzle means will provide for directing hot gas over a greater portion of the turbine blades of each successive stage located closer to the hot gas outlet of the housing. Intermediate each turbine stage there will be provided a compressor means for providing cooling gas to the adjacent turbine stage. Generally, the flow of pressurized cooling gas will be in a direction countercurrent to the flow of hot gas through the successive stages, as this facilitates providing cooling gas to each stage at substantially the same pressure as the hot gas flowing across that same stage. In some instances when the hot gas is at a relatively high pressure, for example, about 300 psia or higher, and the cooling gas must be compressed to substantially equal pressure, it is advantageous to withdraw the cooling gas from the compressor means and pass it in heat-exchange relationship with another cooling fluid to reduce the cooling gas temperature prior to introducing it into the adjacent turbine stage.

The above and related objects and features of the invention will become apparent from a reading of the following description which is given in connection with the accompanying drawing with the novelty thereof being pointed out in the appended claims.

DETAILED DESCRIPTION OF THE DRAWINGS

Figure 1:
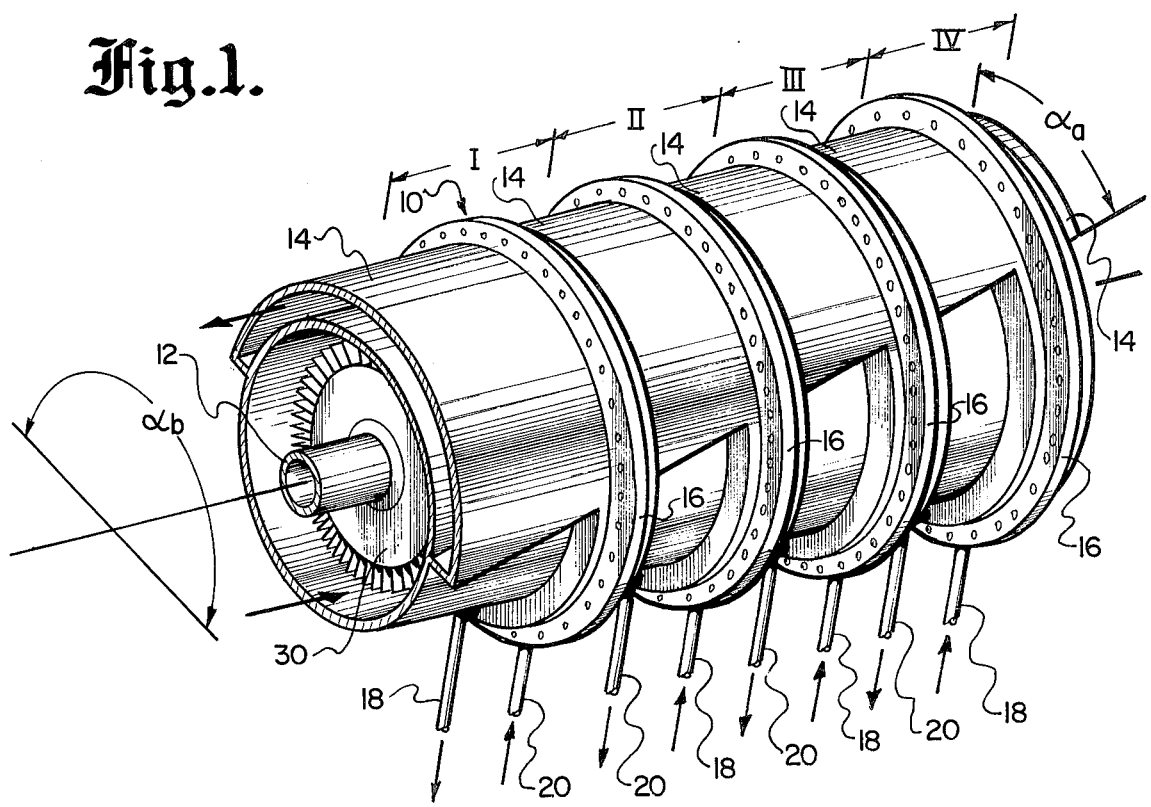
FIG. 1 shows a perspective view of an axial flow gas turbine designed in accordance with the present invention.

Referring to FIG. 1 therein is depicted a particularly preferred embodiment of the invention wherein an axial flow gas turbine assembly 10 comprises a plurality of sections, i.e., I-IV, each section including a turbine stage and a compressor means which are operably connected to a shaft 12. Gas turbine assembly 10 includes a hot gas duct 14 which extends about an increasing portion of the periphery of each successive turbine stage. Thus, in section IV hot gas duct 14 extends about a peripheral arc $\alpha_a$ and gradually expands to an even greater peripheral arc $\alpha_b$ in section I. Gas turbine assembly 10 further includes a cooling gas shroud 16 which encompasses another portion of a peripheral arc about each individual turbine stage, which arc decreases in an amount generally corresponding to the increase in the arc covered by hot gas duct 14. It will be appreciated that compression of the cooling gas will result in an increase in its temperature. In some instances the temperature increase may be such that the compressed or pressurized cooling gas leaving the compressor means has a temperature too high to maintain the turbine blades within a desired temperature range. In such instance, pressurized cooling gas from each compressor means is withdrawn through outlets 18 and cooled prior to introduction to the adjacent gas turbine stage through inlet 20.

In this preferred embodiment it is seen that the hot gas and cooling gas flow through gas turbine assembly 10 in a direction countercurrent to one another. This arrangement has a particular advantage in that it minimizes the amount of ducting required. More particularly, as the hot gas passes through hot gas duct 14 and through the successive turbine stages it is expanded and cooled. Thus, the coolest and lowest pressure gas passes through the turbine stage in section I. The compressor means adjacent that turbine in section I is not required to raise the pressure of the cooling gas as much as it would if it were supplying cooling gas to the turbine stage in section IV. It is, of course, preferred that the cooling gas and the hot gas passing over the same turbine stage have substantially the same static pressure to minimize any leakage between the hot gas and cooling gas portions of that turbine stage.

Figure 2:
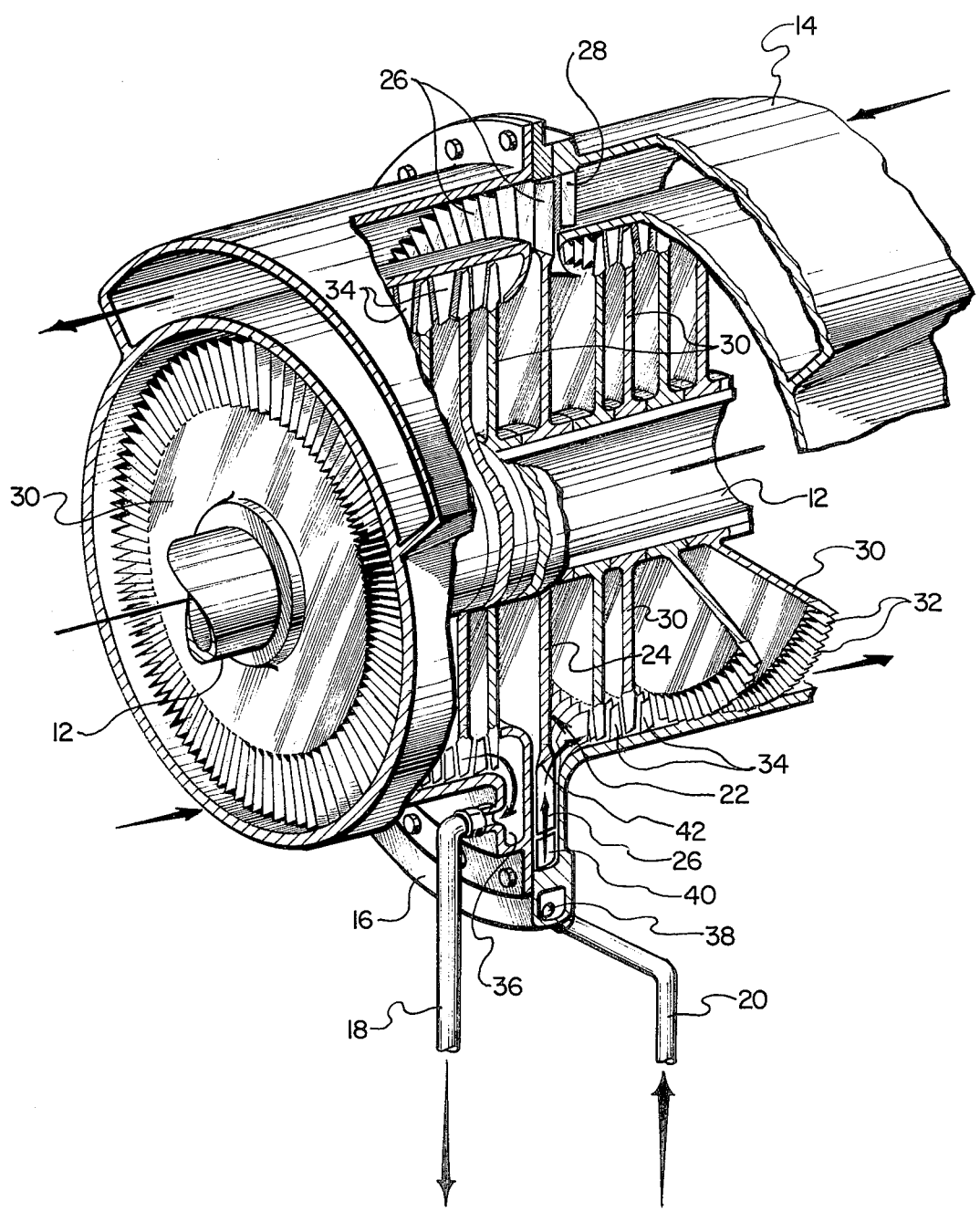
FIG. 2 is a perspective view partially cut away of a typical section of the gas turbine depicted in FIG. 1.

Referring now to FIG. 2 therein is depicted a partially cut away segment of gas turbine assembly 10 which shows in more detail a typical turbine stage and compressor means. More specifically, it is seen that turbine stage 22 comprises a turbine rotor or disc 24 which is operably connected to shaft 12 and a plurality of turbine blades located about the periphery of rotor 24. Each blade comprises a root section which is attached to rotor 24 and an outer blade surface which terminates in a radially outwardly extending tip section. Located within hot gas duct 14 are a plurality of stationary turbine nozzle blades 28 for directing a flow of hot gas over a portion (preselected number) of turbine blades 26. It is a particular advantage of the present invention that the airfoil design of the turbine blade need not be compromised in the interest of cooling such as is the case where cooling air is passed internally through the turbine blades and provision must be made for such passageway.

Each compressor means comprises at least one and preferably a plurality of compressor wheels 30 which also are operably connected to shaft 12 and in axial alignment with turbine stage 22. Each compressor wheel 30 is provided with a plurality of compressor blades 32 affixed to the outer periphery of the wheel. Intermediate each compressor wheel 30 there is provided an array of compressor stators or vanes 34 for directing a compressed gas from one set of compressor blades to the next. The discharge from the high pressure end of the compressor means is in fluid communication with a cooling gas manifold 36 through which the pressurized cooling gas can enter the outlet cooling duct 18 for passage to a heat exchanger (not shown) to reduce its temperature. Thereafter, the pressurized cooling gas is introduced into shroud 16 through inlet duct 20. Shroud 16 includes a passageway 38 which provides fluid communication between duct 20 and a plurality of peripherally spaced, stationary cooling gas nozzle blades 40. Nozzle blades 40 impart to the cooling gas a relative velocity component radially inward over the tips and outer surfaces of the rotating turbine blades 26 such that the cooling gas flows over the outer surface of the blades towards the root section of the blades. Located adjacent the root section of the blades is a deflection means, such as a beveled surface 42 for directing rapidly moving cooling gas out of shroud 16 and into the next adjacent compressor means.

It is a critical feature of the present invention that the cooling gas be passed radially over the outer surface of the turbine blades. The reason for this is that by passing the cooling gas in such a manner the cooling effect is greatly enhanced and, further, the pressure drop is substantially reduced, thus minimizing the pumping requirements and energy losses. While in the embodiment depicted the cooling gas is passed radially inward over the turbine blades it also is within the scope of the present invention, and sometimes may be preferred, to introduce the cooling gas adjacent the root section of the blades whereby the deflection means will direct the gas radially outward over the outer surface of the blades.

The gas turbine of the present invention provides many advantages which were heretofore unobtainable. More particularly, higher gas temperatures can be utilized while concurrently maintaining the temperature of the blades sufficiently low so that conventional materials of construction may be utilized. Further, since it is possible to maintain the temperature of the turbine blades well below any critical maximum value, any erosion effects resulting from particulates in the gas stream are substantially reduced. Thus, the need for having a substantially particulate-free gas stream is eliminated. Further, by providing a plurality of stages, high utilization of the energy contained in the hot gas stream is obtainable.

Figure 3:
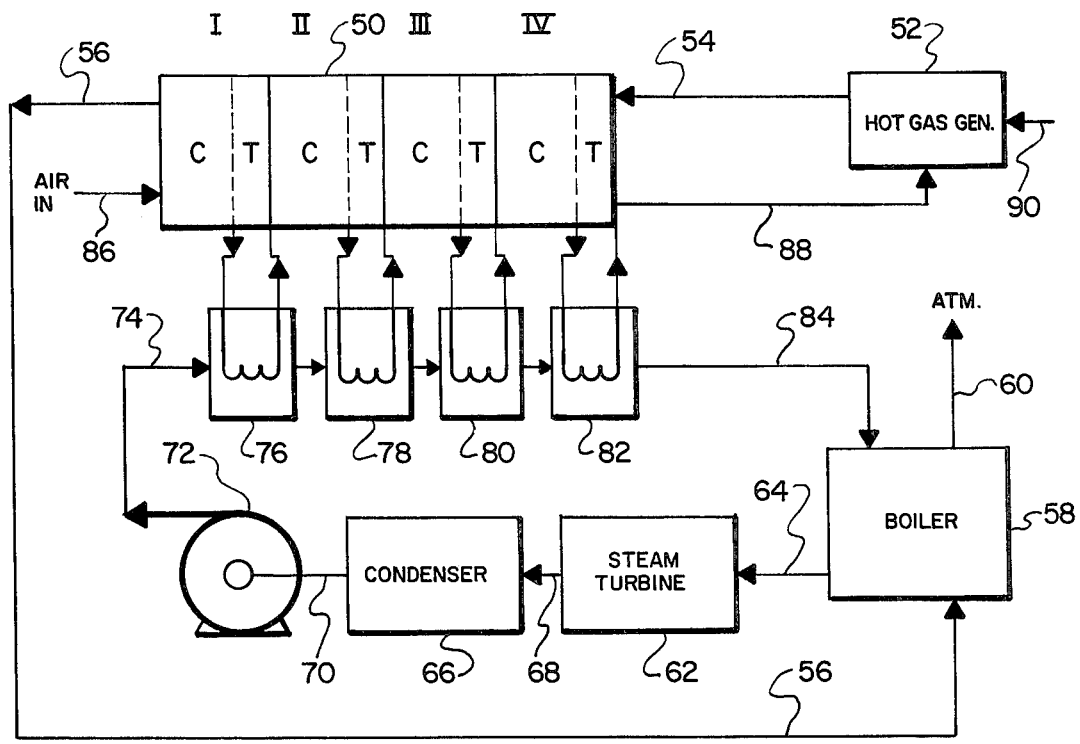
FIG. 3 is a flow diagram of a typical application of the gas turbine of the present invention.

Referring now to FIG. 3 therein is depicted an illustrative application of the gas turbine of the present invention which maximizes the utilization of the thermal energy contained in the hot gas introduced into the turbine. Specifically, schematically illustrated is a four-section gas turbine assembly 50 in which the letters "C" and "T" indicate the compressor means and turbine stages, respectively. Pressurized hot gas from hot gas generator 52 is introduced into turbine assembly 50 via a conduit 54 to produce mechanical power which is utilized in any desired manner. Hot gas leaving turbine assembly 50, after utilization of a substantial portion of its energy, is discharged via a duct 56 and introduced into a boiler 58 wherein a substantial amount of the remaining thermal energy is recovered to produce steam. The hot gas, substantially depleted of thermal energy, is discharged to the atmosphere through a stack 60.

The steam generated in boiler 58 is introduced into a conventional steam turbine 62 through a conduit 64 wherein the steam is expanded and cooled, converting the energy contained therein to mechanical energy which may be utilized for the generation of electrical power, driving pumps or the like. The exhaust steam from steam turbine 62 is passed to a condenser 66 via a conduit 68. In condenser 66 the steam is cooled to a liquid state and withdrawn via a conduit 70, a pump 72 and discharged via a pipe 74, where it passes sequentially through indirect heat exchangers 76, 78, 80 and 82 and returned to boiler 58 via a conduit 84. A cooling gas, for example air, is introduced into gas turbine assembly 50 through an air inlet duct 86 where it passes sequentially through the four gas turbine sections. In each of the compressor means in sections I-IV of gas turbine assembly 50 the compressed cooling air is withdrawn from the compressor and introduced into its associated heat exchanger and returned to its adjacent turbine stage, as hereinbefore described.

The compressed gas leaving the last turbine stage in section IV passes through a duct 88 and is introduced into hot gas generator 52. Also introduced into hot gas generator 52 is a fuel through an inlet line 90. Thus, the exhausted compressed cooling gas from turbine assembly 50 serves as a source of preheated combustion air for the fuel in the generation of additional hot gas, while the heat removed from the compressed pressurized cooling gas is transferred to the water introduced into boiler 58. It is seen, therefore, that in the system disclosed high thermal efficiency is obtainable. In addition, any other cooling fluid used in turbine assembly 50 also can be passed in heat-exchange relationship with the feed water from boiler 58 in a similar manner. For example, when it is necessary or desired to pass a cooling fluid in indirect heat-exchange relationship with hot gas duct 14, nozzle blades 28, or both, such cooling fluid could then be passed in heat-exchange relationship with the feed water from boiler 58.

Although the invention has been shown and described with respect to what is now considered to be the preferred embodiment thereof, it will be appreciated by those skilled in the art that various changes and omissions in the form and detail thereof may be made without departing from the spirit and scope of the invention. Thus, while the invention has been described with respect to a stationary gas turbine, it will be appreciated that it also could be utilized in mobile applications. Further, while only one turbine stage is shown it also will be appreciated that turbines could be provided in adjacent pairs on the same shaft or concentric shafts to derive power for different applications. These and many other variations will be apparent to those skilled in the art. Accordingly, the invention may be otherwise practiced within the scope of the teaching set forth herein and is not to be limited by the illustrative and specific embodiments thereof, rather its scope should be determined in accordance with the following claims.

What is claimed is:

1. In a gas turbine including a housing having a hot gas inlet and a hot gas outlet, a rotatable shaft mounted within said housing, at least one turbine stage comprising a turbine rotor, said rotor including a disc member affixed to said shaft and a plurality of turbine blades located about the periphery of said disc, each of said blades having a root section affixed to the disc, and a radially outwardly extending surface terminating in a tip section, the improvement comprising:

nozzle means for directing a hot gas over only a portion of said blades;

a shroud member enveloping another portion of said blades, said shroud member including an inlet and an outlet for a cooling gas;

compressor means for providing a flow of pressurized cooling gas to said shroud;

guide means for directing said cooling gas radially over the surface of said blades; and deflection means for directing cooling gas from said blades to the cooling gas outlet of said shroud.

2. The turbine of claim 1 wherein said compressor means is operably connected to said turbine shaft.

3. The turbine of claim 1 wherein said guide means provides for directing cooling gas radially downward over the tip section of said blades toward the root section and said deflection means is located adjacent the root section of said blades.

4. The turbine of claim 1 wherein said compressor means provides for a flow of pressurized cooling gas in a direction toward the hot gas inlet of said housing.

5. The turbine of claim 1 wherein said compressor means provides cooling gas at a pressure substantially equal to the pressure of the hot gas to be directed over said portion of said blades.

6. The turbine of claim 2 wherein said turbine comprises a plurality of turbine stages in axial alignment with one another and said nozzle means provides for directing hot gas over a greater portion of said turbine blades of each successive stage located closer to the hot gas outlet of said housing.

7. The turbine of claim 6 wherein each turbine stage is provided with a compressor means operably connected to said shaft and having a cooling gas inlet and outlet, the outlet being in fluid communication with the shroud member of an adjacent turbine stage for providing a flow of pressurized cooling gas to said shroud member.

8. The turbine of claim 7 wherein said compressor means provides for a flow of cooling gas in a direction toward the hot gas inlet of said housing.

9. The turbine of claim 8 further including a cooling gas duct means interconnecting the shroud outlet of each turbine stage with the next adjacent compressor means inlet.

10. The gas turbine of claim 9 wherein said cooling gas duct means further includes heat-exchange means for passing cooling gas in heat-exchange relationship with a cooling fluid prior to introduction of the cooling gas into the next adjacent compressor stage.

11. In an axial flow gas turbine, including an elongated housing having a hot gas inlet at one end and a hot gas outlet at an opposite end, a rotatable shaft mounted within said housing, at least one turbine stage comprising a turbine rotor, said rotor including a disc member affixed to said shaft and a plurality of turbine blades located about the periphery of said disc, each of said blades having a root section affixed to the disc and a radially outwardly extending outer surface terminating in a tip section, the improvement comprising:

nozzle means for directing a flow of hot gas over only a portion of said blades;

a shroud member enveloping another portion of said blades, said shroud member including an inlet and outlet for a cooling gas;

guide means for directing said cooling gas radially over the surface of said blades;

deflection means for directing said cooling gas from said blades to the cooling gas outlet of said shroud; and compressor means operably connected to said turbine shaft and having a cooling gas inlet and a cooling gas outlet, the outlet being in fluid communication with said shroud inlet for providing a flow of pressurized cooling gas to said shroud in a direction toward the hot gas inlet of said housing at a pressure substantially equal to the pressure of the hot gas to be directed over said portion of said blades.

12. The turbine of claim 11 wherein said turbine comprises a plurality of turbine stages in axial alignment with one another and said nozzle means provides for directing hot gas over a greater portion of said turbine blades of each successive stage located closer to the hot gas outlet end of said housing and a compressor means is provided adjacent each of said plurality of turbine stages.

13. The turbine of claim 12 further including a cooling gas duct means interconnecting the shroud outlet of each turbine stage with the next adjacent compressor means cooling gas inlet.

14. The turbine of claim 13 wherein said guide means provides for directing cooling gas radially downward over the tip section of said blades toward the root section and said deflection means is located adjacent the root section of said blades.

15. The turbine of claim 14 wherein said cooling gas duct means further includes heat-exchanger means for passing cooling gas in heat-exchange relationship with a cooling fluid prior to introduction of the cooling gas into the next adjacent compressor stage.

* * * * *